United States Patent [19]

Hasiguti

[11] Patent Number: 5,644,769
[45] Date of Patent: Jul. 1, 1997

[54] SYSTEM FOR OPTIMIZING PROGRAM BY VIRTUALLY EXECUTING THE INSTRUCTION PRIOR TO ACTUAL EXECUTION OF THE PROGRAM TO INVALIDATE UNNECESSARY INSTRUCTIONS

[75] Inventor: Wataru Hasiguti, Kyoto, Japan

[73] Assignee: Matsushita Electric Industrial Co., Ltd., Osaka, Japan

[21] Appl. No.: 699,220

[22] Filed: Aug. 19, 1996

Related U.S. Application Data

[63] Continuation of Ser. No. 258,990, Jun. 13, 1994, abandoned.

[30] Foreign Application Priority Data

Jun. 14, 1993 [JP] Japan .................. 5-141728

[51] Int. Cl.[6] .................................................. G06F 9/44
[52] U.S. Cl. .................. 395/709; 364/253.1; 364/259.2; 364/280.1; 364/280.4; 364/280.5; 364/DIG. 1
[58] Field of Search ........................... 395/709, 800; 364/DIG. 1, DIG. 2

[56] References Cited

U.S. PATENT DOCUMENTS

| | | | |
|---|---|---|---|
| 5,115,502 | 5/1992 | Tallman | 395/500 |
| 5,293,613 | 3/1994 | Hayden et al. | 395/575 |
| 5,301,325 | 4/1994 | Benson | 395/700 |
| 5,339,238 | 8/1994 | Benson | 395/700 |
| 5,394,558 | 2/1995 | Arakawa et al. | 395/800 |
| 5,421,028 | 5/1995 | Swanson | 395/800 |
| 5,428,809 | 6/1995 | Coffin et al. | 395/800 |
| 5,450,585 | 9/1995 | Johnson | 395/709 |
| 5,457,799 | 10/1995 | Srivastava | 395/709 |

FOREIGN PATENT DOCUMENTS

| | | |
|---|---|---|
| 63-261430 | 10/1988 | Japan . |
| 4-17031 | 1/1992 | Japan . |

*Primary Examiner*—Meng-Ai T. An
*Attorney, Agent, or Firm*—McDermott, Will & Emery

[57] ABSTRACT

For each instruction of an assembler program, a register value settled by virtual execution by a resistor value extracting circuit is extracted as an internal state of a computer and stored in a storage. When a register value extracted for one instruction is identical with at least a part of a register value extracted for a prior instruction to the instruction, an unnecessary instruction judging circuit judges the instruction to be an unnecessary instruction which overlaps the prior instruction, then the unnecessary instruction is deleted from the program by a modifying circuit. Or the execution of the unnecessary instruction is inhibited, leaving the unnecessary instruction in the program. Thereby, the unnecessary instruction overlapping the prior instruction is easily detected. Thus the execution speed is enhanced and the program size is reduced.

10 Claims, 5 Drawing Sheets

| 202 | MOV REG, 0x1000 |
| 203 | MOV REG_H, 0x10 |
| 204 | MOV REG_L, 0x10 |

| 301 | MOV | REG1. | 0×1000 |
| 302 | CLR | REG2 | |
| 303 | MOV | REG2. | (100) |
| 304 | ADD | REG2. | 1 |
| 305 | MOV | REG1. | 0×1000 |

Fig. 5

| 401 | MOV | DST, | SRC |
| 402 | MOV | DST, | SRC |
| 403 | SET | FLAG | |
| 404 | CLR | FLAG | |
| 405 | ADD | DST, | 0 |
| 406 | SUB | DST, | 0 |
| 407 | MUL | DST, | 1 |
| 408 | DIV | DST, | 1 |

SYSTEM FOR OPTIMIZING PROGRAM BY VIRTUALLY EXECUTING THE INSTRUCTION PRIOR TO ACTUAL EXECUTION OF THE PROGRAM TO INVALIDATE UNNECESSARY INSTRUCTIONS

This is a continuation application of application Ser. No. 08/258,990 filed Jun. 13, 1994 now abandoned.

BACKGROUND OF THE INVENTION

This invention relates to a device and method for optimizing a program by invalidating an instruction of which execution is unnecessary in the program.

Conventionally, as disclosed in, for examples, Laid Open unexamined Japanese Patent Application Nos. 4-17031 and 3-132828 (corresponding to U.S. patent application, Ser. No. 421,866), the execution speed of a program is enhanced by deleting an unnecessary instruction in the program.

Figure 5:
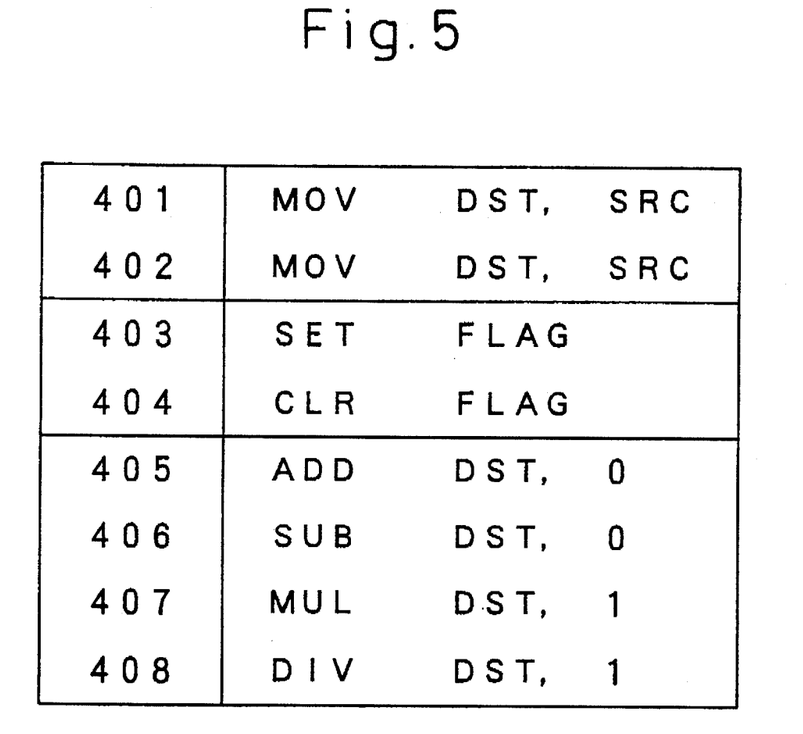
FIG. 5 is a view showing a part of a program capable of being optimized by a conventional device or a conventional method.

Especially, in a program in which plural assembler instructions are arranged, the optimization for reducing the time required for program execution is attained to some extent by deleting an instruction of which execution is unnecessary in the program. FIG. 5 shows a conventional example of a program in which the optimization by deleting the unnecessary instruction is practicable.

In the figure, reference numerals 401 and 402 denote same instructions successively appearing in a program. In this case, the internal state of a computer, i.e. the state of register or memory, is not changed between after execution of the first instruction 401 and after execution of the second instruction 402. Wherein, MOV instruction in the figure means an instruction for transferring a data between memories, between registers or between memory and register. DST denotes a destination which receives the data transmitted and SRC denotes a source which transmits the data. In this case, since the two same data transfer instructions are successive, one of the two instructions 401 or 402 is meaningless, which means one of the instructions 401 or 402 can be deleted.

Reference numerals 403 and 404 denote two different instructions in the program. In this case, the prior instruction 403 becomes meaningless by execution of the following instruction 404. Wherein SET means to set, CLR means to clear and FLAG denotes a flag. The flag is set according to the prior instruction 403, then the flag is immediately cleared by the following instruction 404. The flag setting has no meaning, thus the first instruction 403 can be deleted.

Reference numerals 405–408 denote instructions each for executing a given operation in numeric operation in the program. In FIG. 5, ADD means addition, SUB means subtraction, MUL means multiplication and DIV means division. The instruction 405 is an instruction for adding 0. The instruction 406 is an instruction for subtracting 0. The instruction 407 is an instruction for multiplying 1. The instruction 408 is an instruction for dividing by 1. No numerical values to be processed are changed by the execution of any of the instructions 405–408, thus the instructions 405–408 are unnecessary. Accordingly, the program is optimized by deleting the instructions 405–408.

As mentioned above, in the conventional optimization, the judgement is performed in view of the arrangement of the instructions or the instructions themselves in the program.

Figure 3:
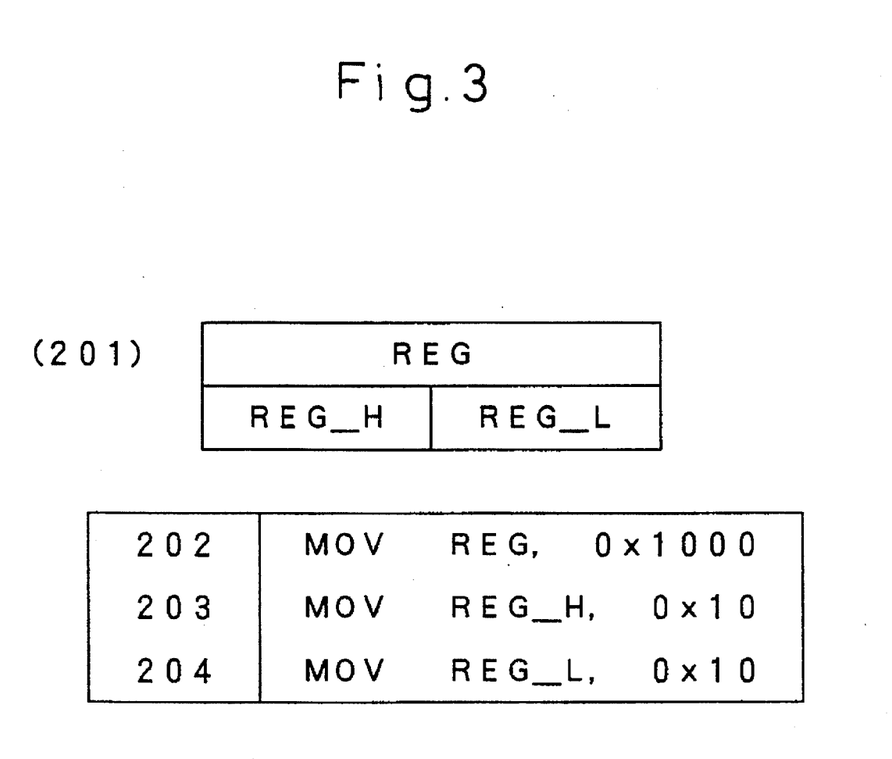
FIG. 3 is a view showing a part of an assembler program in which an instruction partly overlaps a prior instruction.

However, in such a conventional optimization, the program composed of instructions 201–204 arranged as in FIG. 3 cannot be optimized. In FIG. 3, MOV instructions are for data transfer between memories, between registers or between memory and register. REG at the instruction 201 denotes a 2-byte (=16-bit) register, REG_H denotes an upper 1-byte part of the register and REG_L denotes a lower 1-byte part thereof. 0×1000 means 1000 in hexadecimal numeral. According to the instruction 202, 0×1000 is transmitted to the register REG, namely, 0×10 and 0×00 are transmitted respectively to the upper and lower parts REG_H, REG_L substantially. Then, according to the instructions 203 and 204, 0×10 are transmitted to the upper and lower parts REG_H, REG_L respectively. Consequently, the transmission of 0×10 to the upper part REG_H is repeated by the instructions 202 and 203, which means no substantial influence by deletion of the instruction 203.

However, since the conventional optimization is performed in view of only the arrangement of or the meaning of the instructions, the presence of repeated instruction cannot be detected in the program including the instruction which changes the internal state of the computer at any time, such as value of the register. Therefore, the optimization cannot be performed.

SUMMARY OF THE INVENTION

The present invention has its object of enhancing the execution speed of the program without execution of an unnecessary instruction, taking account not only of the arrangement and meaning of the instructions but also of whether the internal state of the computer such as the register value is substantially changed.

To attain the above object, in the present invention, an instruction in the program is virtually executed, and the settled internal state of the computer, such as register value is stored. When the internal state, i.e. the register value, after virtual execution of a following instruction, is not changed, the following instruction is invalidated (deleted) as a repeating unnecessary instruction.

In detail, the present invention is intended for a device for optimizing a program composed of a plurality of instructions to be executed in a computer. The device comprises:

extracting means for virtually executing an instruction of the program and for extracting an internal state of the computer which is settled by the virtual execution;

storage means for storing the settled internal state of the computer which is extracted by said extracting means;

judging means for judging, by comparing the settled internal state of the computer which is extracted by the extracting means according to the instruction of the program with a settled internal state of the computer which is stored in the storage means for a prior instruction, the instruction to be an unnecessary instruction when the former is identical with at least a part of the latter; and invalidating means for invalidating the unnecessary instruction upon judgement by the judging means so as not to execute the unnecessary instruction by the computer.

According to the above basic construction, for each instruction of the program, the internal state of the computer which is settled by the virtual execution of the instruction is extracted and stored. If the settled internal state is identical with at least a part of that for a prior instruction, namely if the instruction substantially overlaps a prior instruction, the instruction is judged to be an unnecessary instruction. Accordingly, an unnecessary instruction which cannot be judged to be unnecessary only in view of the arrangement or the meaning of the instructions can be easily detected and invalidated (deleted) so as not to be executed. In other words, no execution of the unnecessary instruction is required, thus reducing the program size and the time required for executing the program.

In the above basic construction, a register value or a flag value settled by the virtual execution of the instruction is extracted as the internal state of the computer.

At invalidation, the unnecessary instruction may be deleted from the program, or execution of the unnecessary instruction may be inhibited, while leaving it in the program. If the unnecessary instruction is left in the program, the unnecessary instruction can be used as a sample for improving the program.

The device further comprises:

presetting means for presetting a sort of processible instruction which is to be invalidated by the instruction invalidating means; and processible instruction judging means for judging whether an instruction of the program belongs to the sort of processible instruction which is preset in the presetting means, wherein the extracting means performs, upon receipt of the judged result by the processible instruction judging means, virtual execution for only an instruction belonging to the sort of processible instruction to be invalidated.

Thus, an instruction which cannot be invalidated is excluded before the optimization of the program, so that the virtual execution and the extraction of the internal state of the computer are performed for only the invalidatable instruction. As a result, high-speed optimization is contemplated without unnecessary execution.

Further, the device may be provided with:

change instruction judging means for judging, upon receipt of the judged result by the processible instruction judging means, whether the instruction which belongs to the sort of instruction not to be invalidated is an instruction which changes the internal state of the computer; and control means for controlling the extracting means and the storage means in accordance with the judged result by the change instruction judging means so that the extracting means virtually executes the instruction which changes the internal state of the computer and the storage means stores the thus settled internal state of the computer.

Accordingly, the virtual execution is performed for the instruction which is not processible and changes the internal state of the computer, and the thus settled internal state of the computer is stored. Therefore, when a following processible instruction overlaps the instruction, the following instruction is invalidated as the unnecessary instruction, thus further optimizing the program.

In the above basic construction, means for making the internal state of the computer for an instruction indefinite when the internal state of the computer which is settled by the extracting means cannot be extracted may be provided.

Especially, the present invention displays remarkable effects upon application to a program composed of assembler instructions. In the assembler program, a plurality of instructions are likely to overlap with one another, and the overlap is hard to detect. However, in the present invention, the unnecessary instruction overlapping a prior instruction is detected, thus optimizing the program.

In the present invention, a method for optimizing a program composed of plural instructions executed in a computer, comprises the steps of:

virtually executing an instruction of the program and extracting an internal state of the computer which is settled by the virtual execution;

storing the settled internal state of the computer which is extracted at the extracting step;

judging, by comparing the settled internal state of the computer which is extracted for an instruction of the program with a settled internal state of the computer which is stored for a prior instruction to the instruction, the instruction to be an unnecessary instruction when the former is identical with at least a part of the latter; and invalidating the unnecessary instruction so as not to be executed in the computer.

The same effects can be obtained according to the above basic method by adopting the above selective or additional constitution described in the device for optimizing a program.

DETAILED DESCRIPTION OF THE INVENTION

Description of an embodiment of the present invention is made below, with reference to accompanying drawings.

Figure 1:
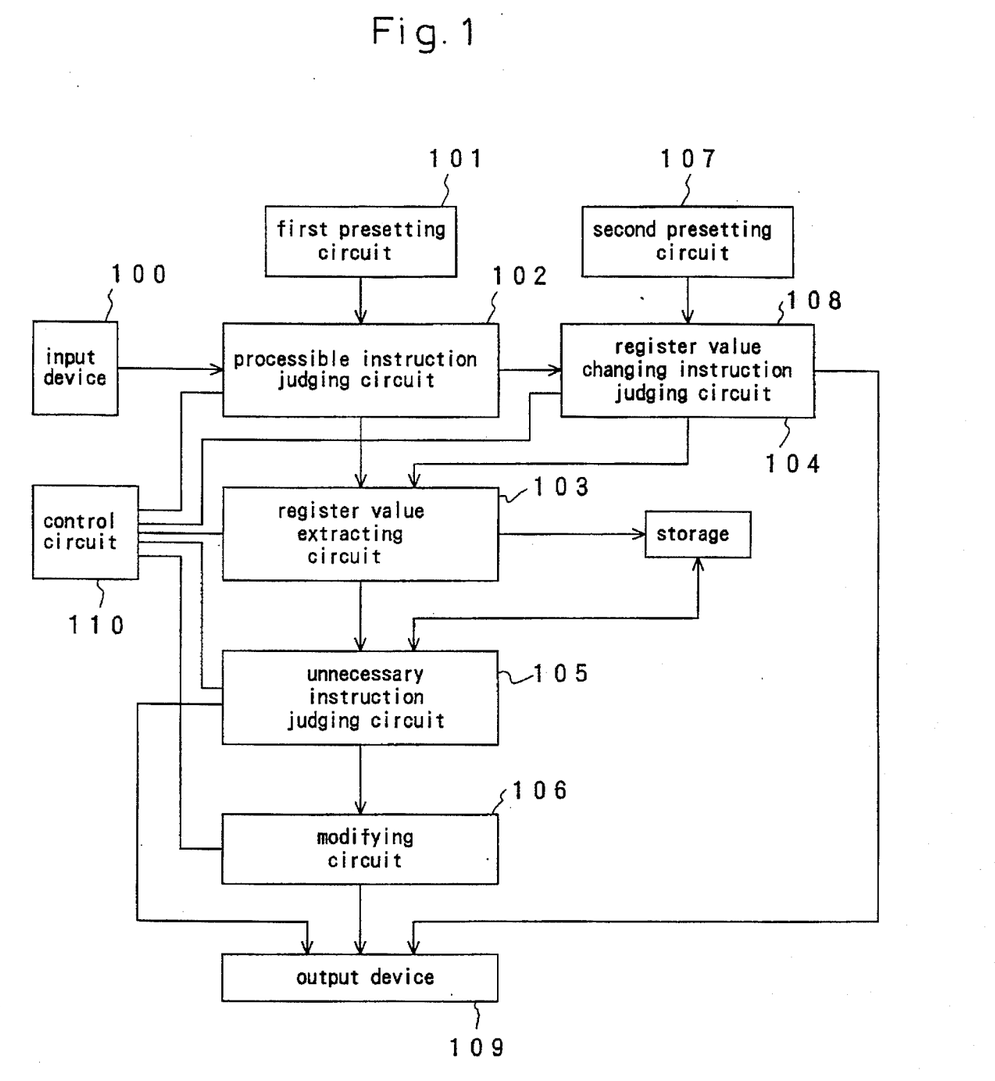
FIG. 1 is a block diagram showing a construction of a device for optimizing an assembler program according to an embodiment of the present invention.

FIG. 1 shows a construction of a device for optimizing an assembler program according to the embodiment of the present invention. In the figure, reference numeral 100 denotes an input device for inputting an instruction of an assembler program. 101 denotes a first presetting circuit for presetting a sort of an instruction which is processible (invalidated) out of the instructions in the assembler program. For example, MOV instruction is entered in the first setting circuit 101 as the processible instruction. 102 denotes a processible instruction judging circuit for judging whether an instruction of the assembler program which is input from the input device 100 is a processible instruction of which the sort is preset in the first presetting circuit 101. Wherein, all instructions may be virtually executed without the first setting circuit 101 and the processible instruction judging circuit 102. However, no extra virtual execution is performed by providing the first setting circuit 101 and the processible instruction judging circuit 102, thus speeding up the optimization.

Reference numeral 103 denotes a register value extracting circuit for virtually executing with a computer only the processible instruction output from the processible instruction judging circuit 102 and for extracting the thus settled value of a register (not shown). 104 denotes a storage for storing the register value extracted by the register value extracting circuit 103. The storage 104 is provided with a register value storage part (not shown) for storing the register value settled by the virtual execution of the assembler instruction. 105 denotes an unnecessary instruction judging circuit for comparing a register value settled for a certain instruction which is extracted by the register value extracting circuit 103 with a register value settled by virtual execution of a prior instruction and stored in the storage 104 and for judging the instruction to be an unnecessary instruction upon conformity of the register value settled for the instruction to at least a part of the register value settled for the prior instruction. 106 denotes a modifying circuit for deleting the instruction judged to be unnecessary by the unnecessary instruction judging circuit 105.

Reference numeral 107 denotes a second presetting circuit for presetting a sort of instruction which changes the register value. 108 denotes a register value change instruction judging circuit for judging whether an instruction judged not to be processible by the processible instruction judging circuit 102 belongs to the sort of instruction which changes the register value, which is preset in the second presetting circuit 107. 109 denotes an output device for outputting outside signals from the unnecessary instruction judging circuit 105, the register value change instruction judging circuit 108 and the modifying circuit 106. 110 denotes a control circuit for controlling each operation of the processible instruction judging circuit 102, the register value extracting circuit 103, the unnecessary instruction judging circuit 105, the modifying circuit 106, the register value change instruction judging circuit 108.

Figure 2:
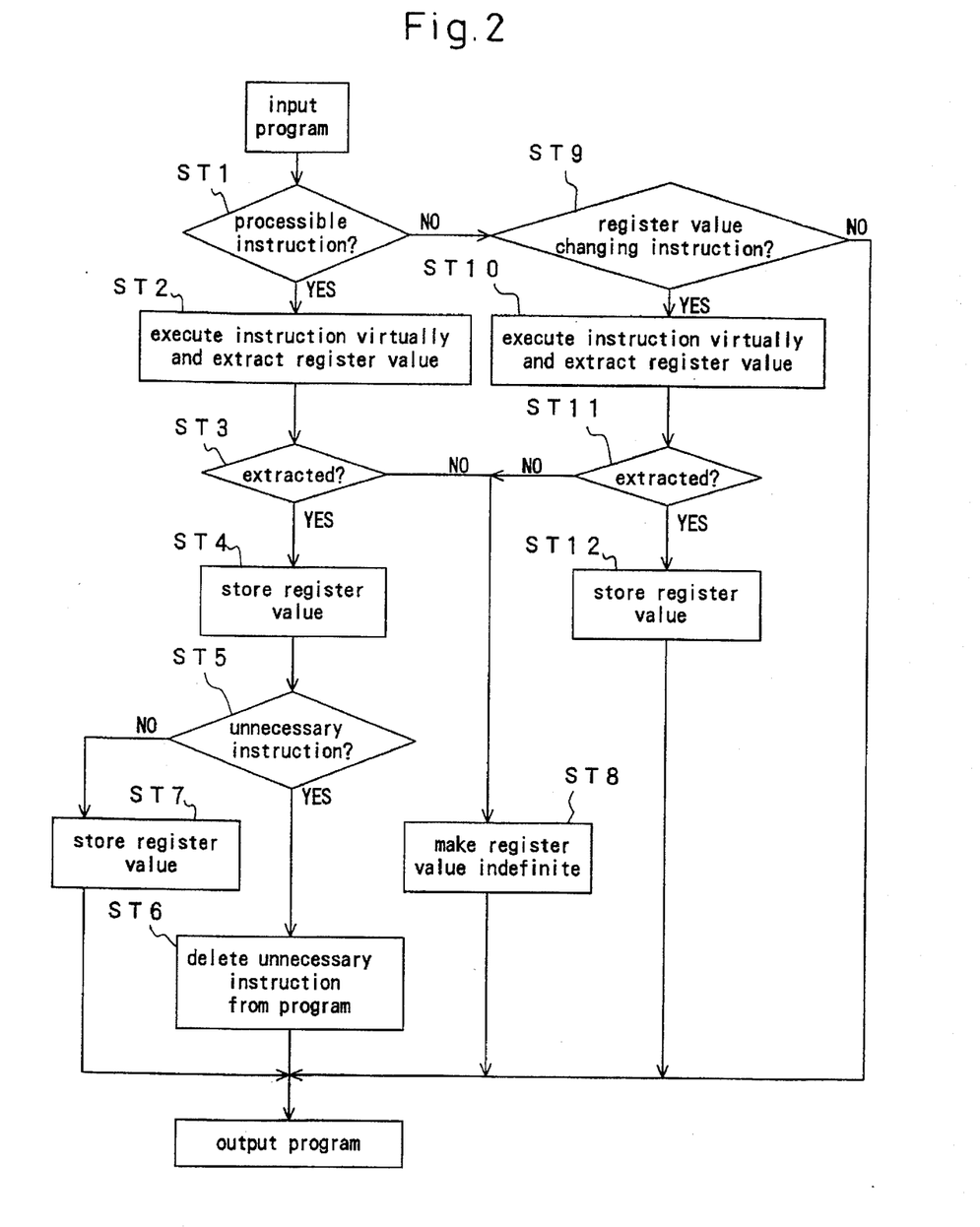
FIG. 2 is a flow chart showing a procedure of the optimization of the assembler program according to the embodiment.

The operation of the thus constructed optimization device is discussed next, referring to a flow chart of FIG. 2.

When an instruction of the assembler program is input from the input device 100, whether the instruction is a processible (deletable) instruction belonging to the sort set in the first setting circuit 101 is judged by the processible instruction judging circuit 102 at step ST1. In this embodiment, MOV instruction is entered in the first setting circuit 101 as an instruction capable of being deleted. Accordingly, the instruction is judged to be deletable when the instruction is MOV instruction and is judged not to be deletable when the instruction is not MOV instruction. The routine proceeds to step ST2 when the instruction is MOV instruction and to step ST9 when the instruction is not MOV instruction.

Next, when the instruction is judged to be deletable at the judgement of step ST1, the instruction is virtually executed like an actual program execution by the register value extracting circuit 103 at step ST2 to extract the register value settled by the virtual execution. At step ST3, whether the extraction of the register value has succeeded is judged. Upon extraction success, the register value extracted is stored into the register value storage part in the storage 104 at step ST4. Upon extraction failure due to computer capacity or the like, the routine proceeds to step ST8 to make the register value in the storage 104 indefinite.

Upon extraction success, after step ST4, the routine proceeds to step ST5 to compare, by the unnecessary instruction judging circuit 105, the register value extracted for the present instruction being processed with a register value extracted and stored in the storage 104 for a prior instruction. When the register value extracted for the present instruction conforms to the register value stored for the prior instruction, or conforms to a part of the register value stored for the prior instruction, the present instruction is judged to be unnecessary. In this case, the internal state of the computer is not changed and that the instruction overlaps the prior instruction.

For example, suppose that the value of the settled upper 1-byte part REG_H is 0×10 as a result of virtual execution of the instruction 203 shown in FIG. 3. When virtual execution of the instruction 202 prior to the instruction 203 results in the register value REG of 0×1000, the value of the upper 1-byte part REG_H which is settled for the instruction 203 is identical with a part of the register value REG settled for the instruction 202. Namely, since the execution of the instruction 202 makes the value of the upper 1-byte part REG_H of the value of the register REG identical with 0×10 without execution of the instruction 203, the instruction 203 is unnecessary. In this way, the unnecessary instruction is detected.

In the case where the register value referred to in the register value storage part of the storage 104 is indefinite, the judgement results in nonconformity so as not to delete the instruction.

Next, when the instruction is judged to be unnecessary at step ST5, the routine proceeds to step ST6 to delete the instruction from the program. For instance, the transfer instruction 203 to the register in FIG. 3 is deleted. When the instruction is judged not to be unnecessary at step ST5, the routine proceeds to step ST7 to store the extracted register value into the register value storage part of the storage 104, then to output it. The process from step ST2 to step ST7 is the operation for optimizing the program.

On the other hand, when the instruction is judged not to be deletable at step ST1, the routine proceeds to step ST9 to compare, by the register value change instruction judging circuit 108, the instruction with the content preset in the second presetting circuit 107 for judging whether the instruction changes the register value. Because there is a case where an instruction not to be deletable influences the register value. In this case, the register value settled by the virtual execution of the instruction is stored, so that a following instruction to the instruction can be judged to be unnecessary for optimization. When the instruction is judged not to be an instruction which changes the register value at step ST9, the instruction is output without deletion. While, when the instruction is judged to be an instruction which changes the register value at step ST9, the routine proceeds to step ST10 to virtually execute the instruction by the register value extracting circuit 103 for extracting the thus settled register value. Then, at step ST11, whether the extraction of the register value has succeeded is judged. Upon success of register value extraction, the routine proceeds to step ST12 to store the value into the register value storage part of the storage 104. Upon fall of register value extraction, the routine proceeds to step ST8 to make the register value in the register value storage part of the storage 104 indefinite. After any of the steps ST6, ST7, ST8, ST10, ST12 is conducted, the program is output.

As described above, in this embodiment, the instruction in FIG. 3, which cannot be conventionally deleted, can be compared in the register value by the virtual execution of the instruction, thus performing the optimization easily. In other words, deletion of the instructions 203, 204 avoids execution of unnecessary instructions.

Figure 4:
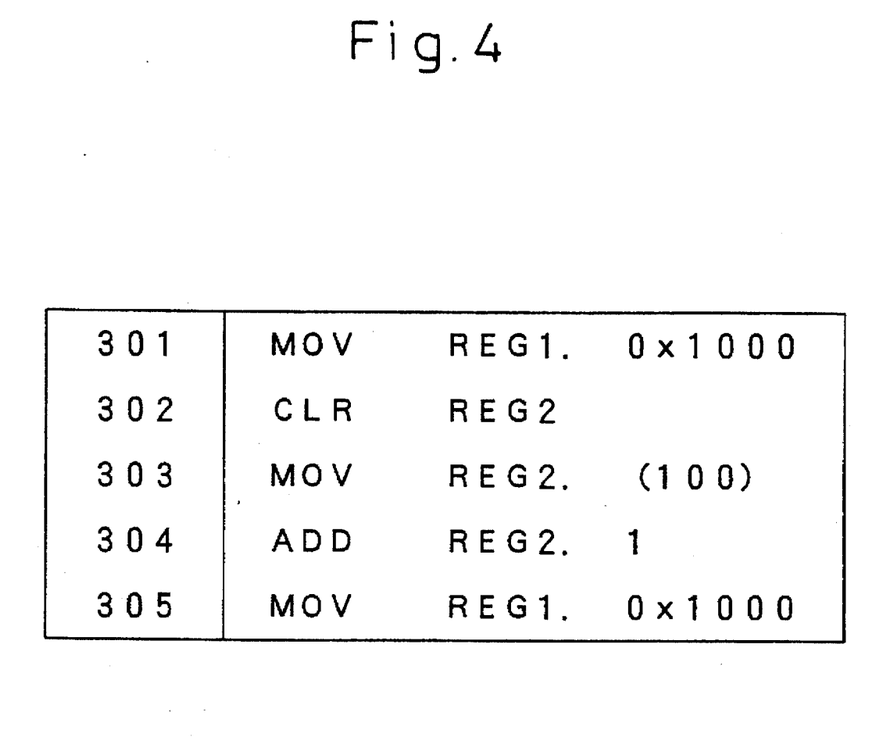
FIG. 4 is a view showing a part of a program in which other instructions are intervened between an instruction and an instruction which overlaps the prior instruction.

Further, the optimization in the present invention can be performed even in the case where instructions are arranged such as in FIG. 4. In detail, in FIG. 4, MOV instruction is an instruction for data transfer between memories, between registers and between memory and register. REG1 at the instruction 301, REG2 at the instruction 302 denote individual 2-byte (=16-bit) registers. 0×100 indicates 1000 in hexadecimal numeral. According to the instruction 301, 0×1000 is transmitted to the register REG1. According to the instruction 302, the value of the register REG2 is cleared, the value at 100-address is transmitted to the register REG2 according to the instruction 303, then 1 is added to the value of the register REG2 according to the instruction 304. Subsequently, according to the instruction 305, 0×1000 is transmitted again to the register REG1. In the example of FIG. 4, the instructions for processing of the register REG2 which do not influence the register REG1 are intervened between the instructions 301, 305 for processing of the register REG1. However, the instructions 301, 305 are for transferring 0×1000 to the register REG1, which is repeated. The instructions in such an arrangement cannot be deleted for optimization by the conventional device, but the instruction 305 can be deleted in the present invention by the virtual execution.

In the above embodiment, the optimization is performed in view of the change of the register value as the internal state of the computer. The internal state of the computer for reference is not limited to the register value in the present invention. Referring to, for example, the flag value as the internal state of the computer, the instruction which repeats the flag value may be judged to be unnecessary. That is, meaningless instruction which does not change the substantial internal state of the computer is deleted.

Further, in this embodiment, the unnecessary instruction is deleted according to the judgement at step ST4. However, the execution of unnecessary instruction in the computer may be inhibited, while leaving the unnecessary instruction in the program. For example, the unnecessary instruction 203 in FIG. 3 is made [:MOV REG_H, 0×10]. The instruction accompanying [:] therebefore is settled as a non-instruction, thus the execution of the unnecessary instruction is inhibited. In this case, the remaining unnecessary instruction can be referenced thereafter.

The present invention is not limited to the optimization for the assembler program composed of the assembler instructions, but is applicable to other kinds of programs.

I claim:

1. A device for optimizing a program composed of a plurality of assembler instructions to be executed in a computer, comprising:

means for extracting a value of an internal state of a computer by virtually executing an instruction of the program prior to an actual execution of the program;

register, wherein the value of the internal state of the computer is a value of said register extracted by the virtual execution of an instruction to be executed;

means for storing the value extracted by said extracting means;

means for judging when an instruction is unnecessary, by comparing the extracted value stored in said storing means with at least a part of a value extracted and stored for a prior instruction, wherein when said value extracted from the virtual execution of the instruction is identical to said value extracted from the prior instruction, the instruction is judged unnecessary; and means for deleting an unnecessary instruction so as not to have the computer execute the unnecessary instruction.

2. The device for optimizing a program of claim 1, further comprising:

means for making the value of the internal state of the computer indefinite when said extracting means fails to extract a value for an instruction to be executed.

3. A method for optimizing a program composed of a plurality of assembler instructions to be executed in a computer, comprising the steps of:

virtually executing an instruction of the program prior to an actual execution of the program and extracting a value of an internal state of the computer, wherein the value of the internal state of the computer is a value of a register which is extracted by the virtual execution of an instruction to be executed;

storing the value which is extracted at said extracting step;

judging when an instruction is unnecessary, by comparing the extracted value stored in said storing means with at least a part of a value extracted and stored for a prior instruction, wherein when said value extracted from the virtual execution of the instruction is identical to said value extracted from the prior instruction, the instruction is judged unnecessary; and deleting the unnecessary instruction so as not to be executed by the computer.

4. The method for optimizing a program of claim 3, further comprising the step of:

making the value of the internal state of the computer for the instruction to be executed indefinite when said step of virtually executing and extracting fails to extract a value of the internal state of the computer.

5. A device for optimizing a preamble program composed of a plurality of instructions in conversion from the preamble program into an object program to be executed in a computer, comprising:

means for presetting a sort of processible instruction;

processible instruction judging means for judging whether the instruction to be executed belongs to the sort of processible instruction, wherein when said instruction to be executed is judged to belong to the sort of processible instruction, the instruction is judged to be deletable;

means for extracting a value of an internal state of a computer by virtually executing an instruction judged to be deletable prior to the actual execution of the program;

means for storing the value extracted by said extracting means;

means for judging when an instruction is unnecessary, by comparing the extracted value stored in said storing means with at least a part of a value extracted and stored for a prior instruction, wherein when said value extracted from the virtual execution of the instruction is identical to said value extracted from the prior instruction, the instruction is judged unnecessary; and means for deleting an unnecessary instruction so as not to have the computer execute the unnecessary instruction.

6. The device for optimizing a program of claim 5, further comprising:

change instruction judging means for receiving from said processible instruction judging means an instruction to be executed that has been judged to not belong to said sort of processible instruction and for judging, whether the instruction to be executed is an instruction which changes the value of the internal state of the computer; and means for controlling said extracting means and said storing means in accordance With the judged result by said change instruction judging means so that said extracting means virtually executes the instruction which changes the value of the internal state of the computer and for controlling said storing means to store said value.

7. The method of optimizing a preamble program composed of a plurality of instructions in conversion from the preamble program into an object program to be executed in a computer, comprising the steps of:

judging whether the instruction to be executed belongs to the sort of processible instruction, wherein when said instruction to be executed is judged to belong to the sort of processible instruction, the instruction is judged to be deletable;

extracting a value of an internal state of a computer by virtually executing an instruction judged to be deletable prior to an actual execution of the program;

storing the value extracted by said extracting means;

judging when an instruction is unnecessary, by comparing the extracted value stored in said storing means with at least a part of a value extracted and stored for a prior instruction, wherein when said value extracted from the virtual execution of the instruction is identical to said value extracted from the prior instruction, the instruction is judged unnecessary; and     deleting an unnecessary instruction so as not to have the computer execute the unnecessary instruction.

8. The method of optimizing a program of claim 7, further comprising the steps of:

judging whether an instruction to be executed judged not to belong to said sort of processible instruction is an instruction which changes the value of the internal state of the computer; and     virtually executing the instruction judged as the instruction which changes the value of the internal state of the computer and extracting the value of the internal state of the computer; and     storing the extracted value of the internal state.

9. A device for optimizing a program composed of a plurality of assembler instructions to be executed in a computer, comprising:

means for extracting a value of a flag of an internal state of a computer by virtually executing an instruction of the program prior to an actual execution of the program;

means for storing the value extracted by said extracting means;

means for judging when an instruction is unnecessary, by comparing the extracted value stored in said storing means with at least a part of a value extracted and stored for a prior instruction, wherein when said value extracted from the virtual execution of the instruction is identical to said value extracted from the prior instruction, the instruction is judged unnecessary; and     means for deleting an unnecessary instruction so as not to have the computer execute the unnecessary instruction.

10. A method for optimizing a program composed of a plurality of assembler instructions to be executed in a computer, comprising the steps of:

virtually executing an instruction of the program prior to an actual execution of the program and extracting a value of a flag of an internal state of the computer;

storing the value which is extracted at said extracting step;

judging when an instruction is unnecessary, by comparing the extracted value stored in said storing means with at least a part of a value extracted and stored for a prior instruction, wherein when said value extracted from the virtual execution of the instruction is identical to said value extracted from the prior instruction, the instruction is judged unnecessary; and     deleting the unnecessary instruction so as not to be executed by the computer.

\* \* \* \* \*